UNITED STATES PATENT OFFICE.

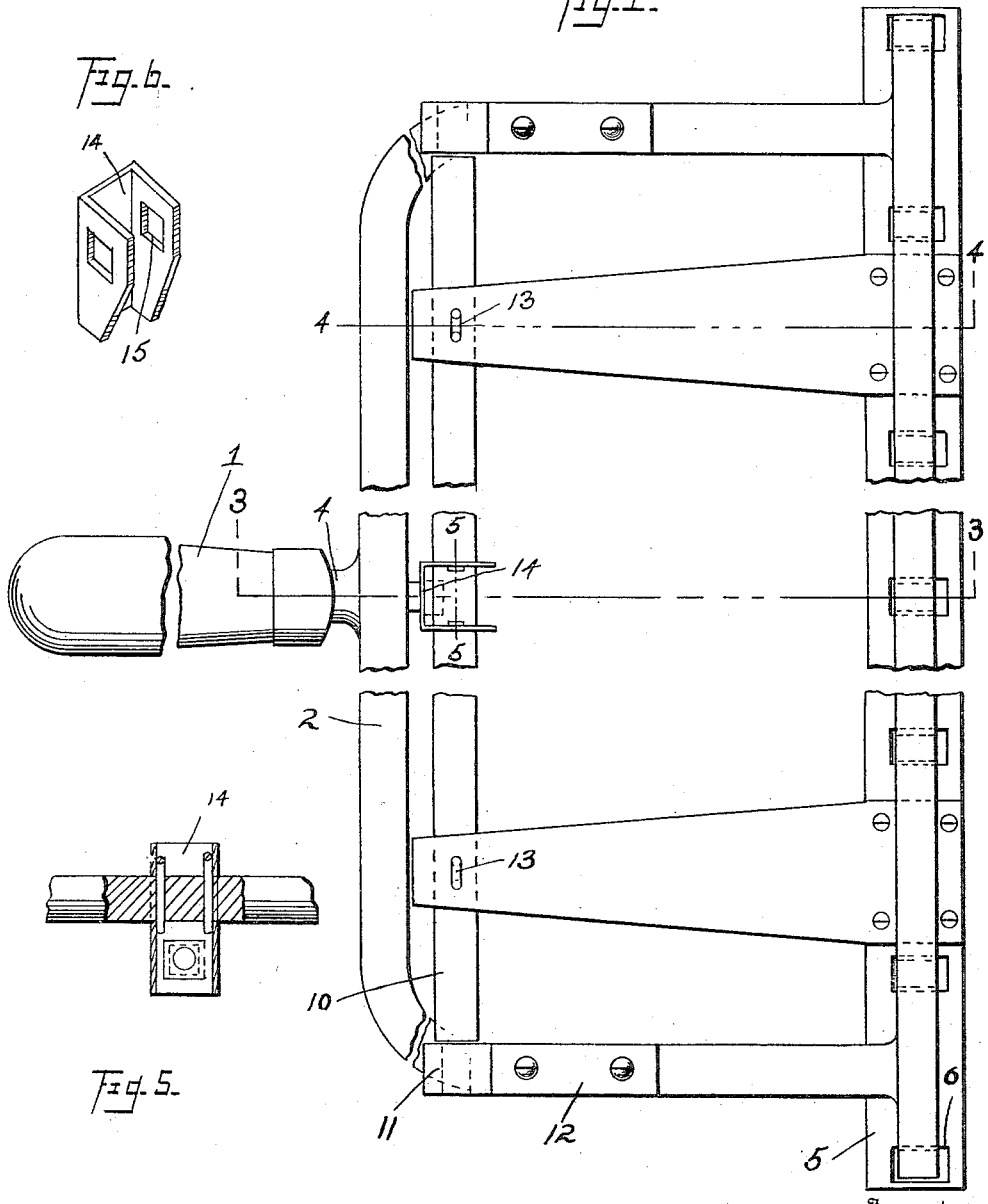

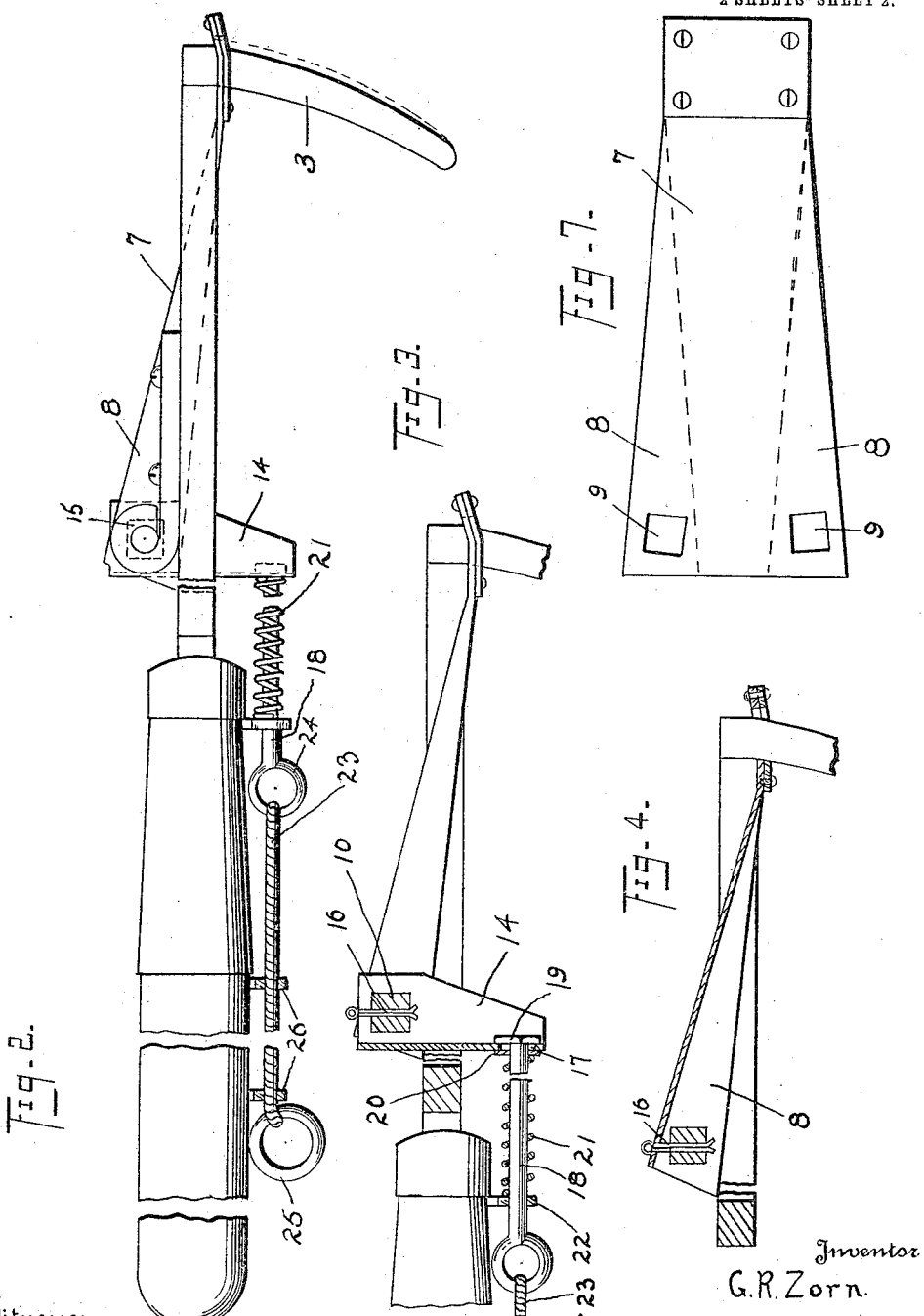

GEORGE ROY ZORN, OF BALTIMORE, MARYLAND.

RAKE ATTACHMENT.

1,124,097.

Specification of Letters Patent.

Patented Jan. 5, 1915.

Application filed March 7, 1914. Serial No. 823,160.

*To all whom it may concern:*

Be it known that I, GEORGE ROY ZORN, a citizen of the United States, residing at Baltimore in the State of Maryland, have invented certain new and useful Improvements in Rake Attachments; and I do hereby declare the following to be a full, clear, and exact description of the invention, such as will enable others skilled in the art to which it appertains to make and use the same.

This invention comprehends certain new and useful improvements in rake cleaners and has for its primary object to provide a device of this character which may be readily attached to a rake without altering the construction of the same and which will be highly efficient in operation, as well as extremely simple and cheap to manufacture.

Another object is to provide a device of this character which will be composed of a minimum number of parts of simple formation and which will be assembled in such manner that the cleaning bar will be resiliently retained in position at the upper ends of the teeth but may be readily moved toward the lower ends thereof to force foreign matter from upon said teeth.

A further object is to provide a device of this character which may be readily secured in position upon a rake of conventional form and in which the parts will be constructed and assembled in such manner that should any of such parts become worn or broken they may be readily replaced at a small cost, and without the necessity of removing the attachment from the rake.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a plan view of a rake of conventional form, with my attachment applied thereto, thereby converting the rake into a self-cleaning rake, Fig. 2 is a side elevational view thereof, Fig. 3 is a detail sectional view taken on the plane of line 3—3 of Fig. 1, Fig. 4 is a detail sectional view taken on the plane of line 4—4 of Fig. 1, Fig. 5 is a fragmentary detail sectional view taken on the plane of line 5—5 of Fig. 1, Fig. 6 is a detail perspective view of the trigger member, and Fig. 7 is a detail plan view of one of the teeth cleaning bar operating members, showing the same in blank form.

Referring in detail to the drawings by numerals 1 designates the handle and 2 the body portion of a rake of the form in which the body portion is of substantially rectangular form and has the slightly inwardly curved teeth 3 depending from the outer bar of said frame, said frame being secured to the handle by means of the shank 4 secured in the end of said handle 1.

In carrying out my invention, I position a tooth cleaning bar 5 upon the teeth 3, said bar having transversely extending oblong openings 6 to accommodate the teeth 3 and allow said bar 5 to be moved downwardly upon said teeth to clean the same of foreign matter adhering thereto, by means of the cleaning bar operating arms 7 which are formed of flat strips of metal having their outer ends securely fastened to the bar 5. The strips are bent downwardly along their longitudinal edges at their inner ends to form the depending sides 8 having the squared openings 9 therein to accommodate the rock shaft 10, which has its opposite ends rotatably mounted in the turned ends 11 of the bracket arms 12 which are secured upon the end members of the frame 2, as clearly shown in Figs. 1 and 2. The arms 7 are locked to the rock shaft 10 by means of the cotter pins 13 or other suitable means, extended through the upper ends of said arms 7 and through the rock shaft 10, whereby when said rock shaft 10 is rocked in one direction, the outer ends of the arms 7 will be forced downwardly, thereby moving the tooth cleaning bar 5 downwardly upon the teeth 3 to clean the latter.

It will be understood that the arms 7 are positioned near the opposite ends of the frame 2, while the trigger member 14 is positioned near the center thereof and mounted upon the rock shaft 10, the sides of said trigger member being provided with square openings 15 to accommodate the shaft 10, it being understood that the shaft 10 is square in cross section and that the trigger member 14 is formed of channel iron. Movement of the trigger member 14 longitudinally of the rock shaft 10 is prevented by the cotter pins 16 or the like engaged through the rock shaft 10 and engaged against the inner faces of the sides of said trigger member 14.

The forward edges of the sides of the trigger member 14 may be beveled or cut away at the lower ends, if desired, as clearly shown in the drawings, thereby reducing the weight of the trigger member and the amount of material required for the same. The main or central portion of said trigger member has an opening 17 near its lower end, through which is engaged a screw shank 18, having a nut 19 threaded upon its forward end, and bearing against the forward face of the main portion of said trigger member, while a washer 20 or the like is positioned upon said screw shank 18 and engaged against the opposite face of the main portion of said trigger member 14, to form a bearing for the helical spring 21 engaged around said shank and having one end bearing against the forward face of the bracket members 22 secured in the outer face of the handle 1 and serving as a bracket and guide for the screw shank 18, an operating cord 23 having one end secured in the looped end 24 of said screw shank 18, while a ring 25 is secured upon the opposite end of said operating cord 23 which, as will be understood, passes through suitable guide members 26 secured in the underface of the handle 1.

From the foregoing it will be clearly apparent that the helical spring 21 serves to resiliently retain the trigger members 14, and 17, and tooth cleaning bar 5, as well as the rock shaft 10 in their normal positions, and upon engagement of the operator's finger in the ring 25, the operating cord 23 and screw shank 18 may be drawn rearwardly against the tension of the spring 21, thereby operating the trigger bar 14 to rock the rock shaft 10 and thereby swing downwardly the forward or outer ends of the arms 7 to move the tooth cleaning bar 5 toward the lower ends of the teeth 3 and thereby clean the same. As soon as the ring 25 is released, however, the helical spring 21 will act to return all of the operative parts to their normal positions and resiliently retain said parts in said normal positions until the operating cord 23 and screw shank 18 are again drawn toward the rear end of the handle 1.

While I have shown and described the preferred embodiment of my invention, it will be understood that minor changes in construction, combination and arrangement of parts may be made without departing from the spirit and scope of the invention as claimed.

Having thus described my invention, I claim:—

1. A device of the class described comprising the combination with a rake body and teeth projecting therefrom; of a rock shaft, means for mounting said rock shaft upon said rake body, a tooth cleaning bar mounted upon said teeth, tooth cleaning bar operating arms secured to said tooth cleaning bar, said operating arms having depending portions, said rock shaft being secured to said depending portions and locked with said operating arms, a trigger member projecting laterally from said shaft, means for operating said trigger member to rock the rock shaft in one direction and thereby force the tooth cleaning member toward the free ends of said teeth, and means for returning the parts to normal position.

2. A device of the character described comprising the combination with a rake body having teeth projecting therefrom and a handle; of a rock shaft mounted upon said body, said rock shaft being square in cross section, the opposite end of said shaft being rounded, whereby said shaft may be rocked in opposite directions within its bearings, a trigger member formed of channel iron, the shaft being extended through the parallel portions of said trigger member, a trigger operating member extended through the depending main portion of said trigger member, means carried by the handle for supporting said trigger operating member, means for drawing said trigger operating member toward the rear end of said handle to operate the trigger member and rock the rock shaft forwardly, a tooth cleaning member mounted upon the teeth of said rake body, connections between said tooth cleaning bar and the rock shaft, whereby said tooth cleaning member will be caused to clean the teeth upon the forward movement of the rock shaft, and means engaged around the trigger operating member to return the operative parts to normal position and resiliently retain said parts against movement.

In testimony whereof I affix my signature in presence of two witnesses.

GEORGE ROY ZORN.

Witnesses:
R. McMahon,
W. R. Bowers.

Copies of this patent may be obtained for five cents each, by addressing the "Commissioner of Patents, Washington, D. C."